April 7, 1959 J. P. QUINE 2,881,389
MEASURING DEVICE FOR COAXIAL CABLES
Filed Jan. 29, 1957 2 Sheets-Sheet 1
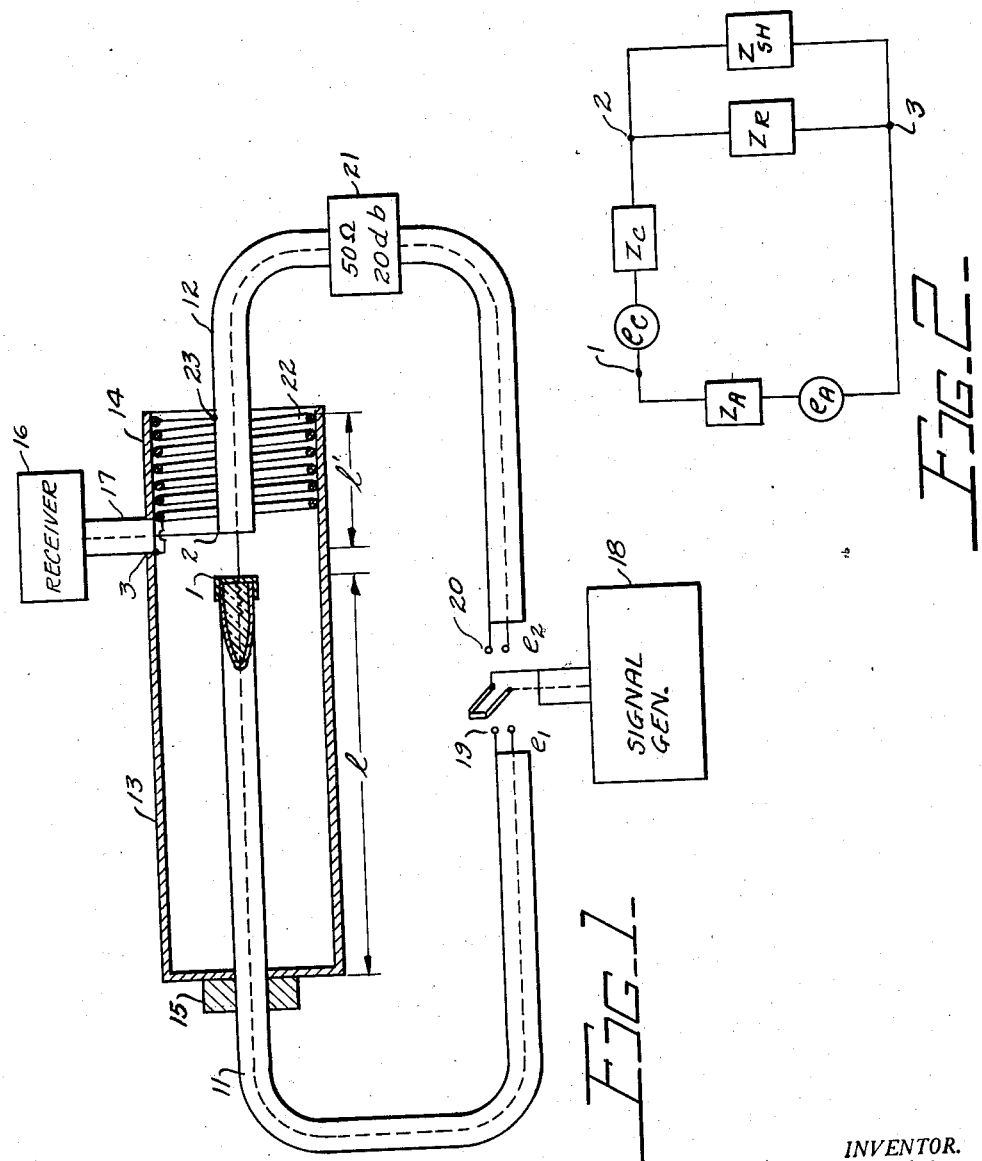
INVENTOR.
JOHN P. QUINE

INVENTOR.
JOHN P. QUINE

United States Patent Office 2,881,389
Patented Apr. 7, 1959

2,881,389

MEASURING DEVICE FOR COAXIAL CABLES

John P. Quine, Troy, N.Y., assignor to the United States of America as represented by the Secretary of the Air Force Application January 29, 1957, Serial No. 637,053

4 Claims. (Cl. 324—58)

This invention relates to a device for obtaining data from which the surface transfer impedance, as a function of frequency, can be calculated for a transmission cable.

Fig. 1 is a circuit schematic of the measuring device employed for obtaining the data.

Fig. 2 is an equivalent circuit for the device of Fig. 1.

Figure 3:
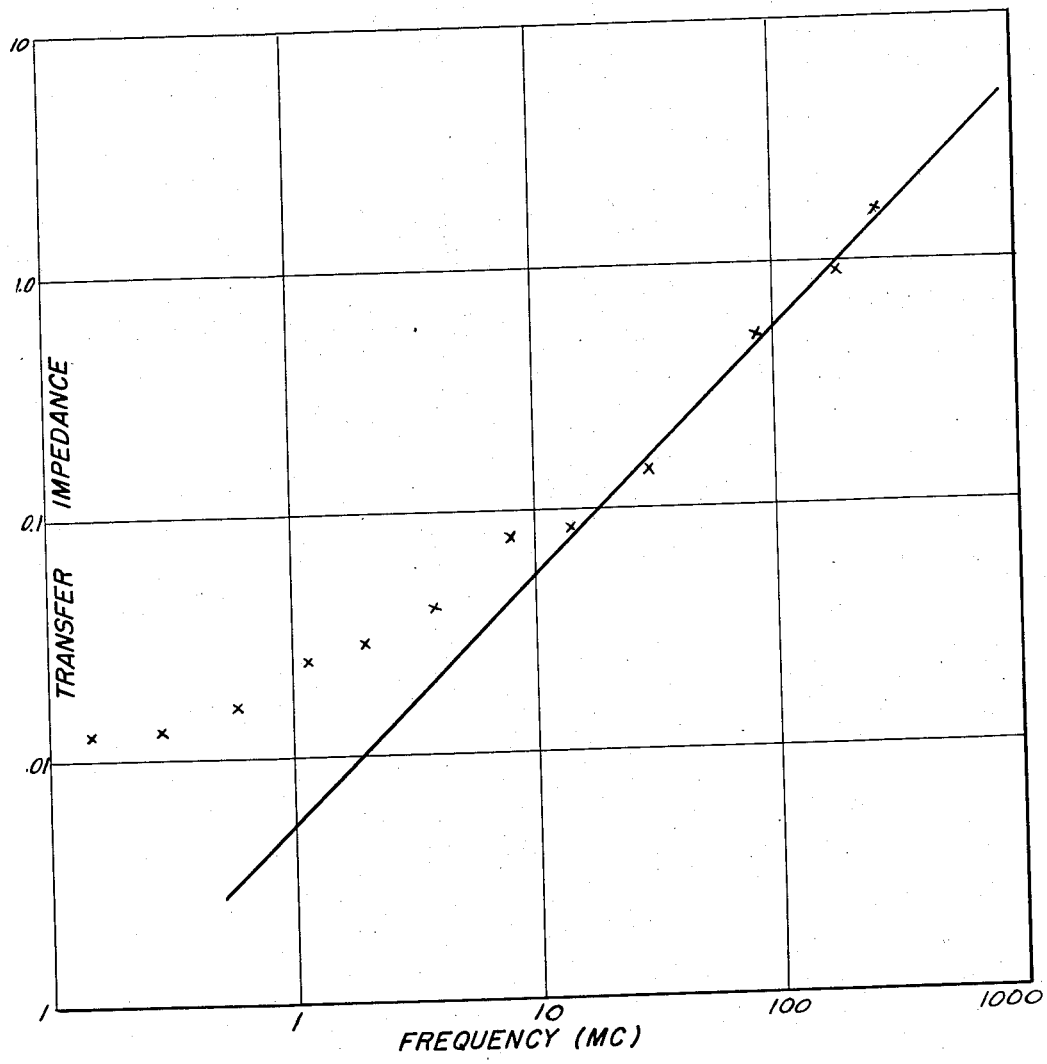
Fig. 3 is a plot of surface transfer impedance versus frequency for one cable tested.

Referring to Fig. 1 of the drawing, the cable 11, which is under test is placed within a copper tube 13 which has a length of $l$ meters and a diameter of 3 inches. A second copper tube 14 is located coaxial with tube 13 and has an injection cable 12 inserted therein. The braid of cable 11 is clamped tightly to copper tube 13 by means of a clamp connector 15. The braid passes continuously through the clamp connector so as to avoid the problem of connector leakage. Cable 11 is terminated in its characteristic impedance by a completely sealed termination which was 50 ohms for the cable tested. A receiver 16 has a coaxial cable 17 connected thereto. The braid of the cable is connected to the junction of tubes 13 and 14 at point 3 and the center conductor is connected to the braid of injection cable 12 at point 2. The center conductor of the injection cable 12 is connected to the braid of cable 11 at point 1. A signal generator 18, having an open circuit output voltage $e_s$ and an output impedance $Z_s$, is connected first to terminal 19 and then to terminal 20 of cables 11 and 12, respectively. The signal generator should have an accurate attenuator and two indicators to show voltage output and frequency. A symmetrical 50 ohm 20 decibel attenuator pad 21 is placed in the cable 12 to produce a 50 ohm load impedance for the signal generator and to provide a 50 ohm source looking into the cable from points 1 and 2. In the equipment used, the line $l'$ is in the form of a coil of double shielded cable 22 wound inside a three inch diameter copper housing to produce a unit of more convenient size. The center conductor of cable 22 is connected to the braid of cable 12 at 23 and to the tube 13 at 3. There must be enough turns in the coil to prevent a lowering of the system sensitivity by the shunting effect of $Z_{SH}$.

The measurement procedure is as follows. The signal generator 18 is first connected to terminal 19 of cable 11. A voltage $e_1$ is developed across the cable equal to:

$$e_1 = \frac{50}{50+Z_s} e_{s1} \quad (1)$$

As a result, a leakage signal is picked up by the receiver and is indicated by a certain meter reading in the receiver. The signal generator is then connected to terminal 20 of cable 12. The signal in the generator is then attenuated to obtain the same reading at the receiver that was obtained with the generator connected to terminal 19. The voltage $e_2$ that is applied to cable 12 is equal to:

$$e_2 = \frac{50}{50+Z_s} e_{s2} \quad (2)$$

Thus, $$\frac{e_2}{e_1} = \frac{e_{s2}}{e_{s1}} \quad (3)$$

This ratio is all that is needed to calculate the surface transfer impedance of the cable.

To show how this ratio is used to calculate the surface transfer impedance, the Thevenin equivalent circuit for terminals 1, 2 and 3 is given in Fig. 2.

When looking from points 1 and 3 back along test cable 11 and copper tube 13, one sees an open circuit leakage voltage $e_A$ and a source impedance $Z_A$. $Z_A$ is the impedance of a shorted line of length $l$ formed by the test cable 11 and the copper tube 13. Next, when looking into the injection cable 12 between points 1 and 2, one sees an open circuit voltage $e_c$ equal to $e_2/5$ (because of the 20 db attenuator 21), and a source impedance $Z_c$ which is approximately equal to 50 ohms. Across points 2 and 3, one sees the receiver impedance $Z_R$ and a parallel impedance $Z_{SH}$ of a shorted line of length $l'$ which is formed by the shield of the injection cable and the coil within the copper tube 14.

It can be seen from the equivalent circuit that $e_A$ and $e_c$ are effectively in series so that for equal receiver indications $e_c$ must be equal to $e_A$.

For low frequencies for which the test cable is electrically short, the surface transfer impedance is calculated as follows:

$$e_c = e_A = e_1 \frac{Z_{12} l}{Z_{01}} \quad (4)$$

where $e_1$ = voltage applied at terminal 19
$Z_{01}$ = characteristic impedance of cable under test
$Z_{12}$ = surface transfer impedance of cable under test
$l$ = length of cable within copper tube 13

Since $e_c = e_2/5$, for the device as shown, the surface transfer impedance can be obtained from the following expression.

$$Z_{12} = \frac{e_2 Z_{01}}{5 e_1 l} = \frac{e_{s2} Z_{01}}{5 e_{s1} l} \quad (5)$$

Therefore since the characteristic impedance of the test cable and the length $l$ are known, the surface transfer impedance can be found by finding the ratio $$\frac{e_{s2}}{e_{s1}}$$

For higher frequencies, account must be taken of the fact that the leakage voltage which arrives at 1—3 from each cable element does not arrive in the same time phase. The leakage voltage expression for high frequencies is as follows.

$$e_c = e_A = \frac{e_1 Z_{12}}{B_2 Z_{01}} A(B_2 l) \quad (6)$$

where terms $e_1$, $Z_{01}$ and $Z_{12}$ are the same as in Equation No. 4 and $B_2$ = the lossless propogation factor for the test cable-copper tube line
$A(B_2 l)$ = the calibration factor which is dependent upon the length $l$, the frequency and the dielectric constant ratio $a$.

The ratio $a$ is equal to the ratio of the propogation factor of the dielectric material of the test cable with respect to the propogation constant of air.

Since the calibration factor $A(B_2 l)$ is not known for all frequencies and since the surface transfer impedance $Z_{12}$ varies uniformly with frequency, it is considered satisfactory to measure $Z_{12}$ only at frequencies for which $B_2l$ is equal to $n\pi$. For these conditions the value for A given in the table below should be employed.

| n | a=1 | a=1.5 | a=2 | a=3 |
|---|-----|-------|-----|-----|
| 1 | 1.57 | 1.7 | 1.33 | 0 |
| 2 | 3.14 | 2.4 | 0 | 0 |
| 3 | 4.72 | 1.7 | 1.33 | 0 |
| 4 | 6.28 | 0 | 0 | 0 |
| 5 | 7.86 | 1.7 | 1.33 | 0 |
| 6 | 9.43 | 2.4 | 0 | 0 |

The expression for the transfer impedance for high frequencies is as follows.

$$Z_{12} = \frac{e_2 B_2 Z_{01}}{5 e_1 A(B_2 l)} = \frac{e_{s2} B_2 Z_{01}}{5 e_{s1} A(B_2 l)} \quad (7)$$

Fig. 3 shows the plot on a log-log scale of the experimental results for the surface transfer impedance as a function of frequency obtained with a sample of R.G. 58 single braided 50 ohm cable with the length $l$ equal to 1.7 meters. This figure shows, as has been stated previously, that for higher frequencies, the surface transfer impedance varies uniformly with frequency.

There is thus provided a device for obtaining a ratio of voltages from which the surface transfer impedance, as a function of frequency can be calculated for a transmission cable.

While a specific embodiment of the invention has been described, it will be understood that numerous changes may be made without departing from the general principles and scope of the invention.

What is claimed is:

1. A device for obtaining data for determining the surface transfer impedance of a cable comprising: means for terminating the cable being tested in its characteristic impedance, a second cable having its center conductor connected to the outer conductor of the cable being tested, a cylindrical conductor having an elongated portion and a short portion, means for securing the cable being tested within the elongated portion of said cylindrical conductor, said last-named means providing a short circuit connection between the outer conductor of said cable and said elongated portion of said cylindrical conductor, an indicating device having a coaxial input means, the outer conductor of said input means being connected to the junction of the elongated portion and the short portion of said cylindrical conductor and the center conductor being connected to the outer conductor of said second cable, means connected between the outer conductor of said second cable and said junction to provide a shunt impedance for said indicating device and a signal generating means adapted to be connected to the free ends of the test cable and the second cable.

2. A device for obtaining data for determining the surface transfer impedance of a cable comprising: an elongated cylindrical conductor and a short cylindrical conductor, said short conductor being located coaxial with the elongated conductor and being connected to one end thereof, means for securing the cable being tested within said elongated conductor, said last-named means providing a short circuit connection between the outer conductor of said cable and the free end of said elongated conductor, a second cable, a signal indicating means having a coaxial input means, the outer conductor of said input means being connected to the junction of said elongated conductor and said short conductor and the inner conductor being connected to the outer conductor of said second cable, an impedance means connected between the outer conductor of said second cable and said junction, a signal generating means having a signal attenuating means therein, means for connecting said signal generating means alternately to the cable being tested and to said second cable, means for terminating the test cable in its characteristic impedance and an attenuating means in said second cable for matching the cable impedance and the impedance of the signal generating means.

3. A device for obtaining data for determining the surface transfer impedance of a cable comprising: an elongated cylindrical conductor with a short cylindrical conductor located coaxial therewith and connected to one end thereof, an injection cable with its outer conductor electrically connected through an impedance to the junction of the two cylindrical conductors, an indicating device having a coaxial input means, the outer conductor of said coaxial input means being connected to said junction and the inner conductor being connected to the outer conductor of said injection cable, means for securing the cable under test within said elongated cylindrical conductor, said last-named means providing a short circuit connection between the outer conductor of said cable and the free end of said elongated conductor, means for completely sealing the end of said test cable and for terminating it in its characteristic impedance, means for electrically connecting the outer conductor of the test cable to the inner conductor of said injection cable, an attenuator impedance matching means connected in said injection cable and a signal generator adapted to be connected to the free ends of the test cable and the injection cable.

4. A device for obtaining data for determining the surface transfer impedance of a cable comprising: means for terminating the cable being tested in its characteristic impedance, a second cable having its center conductor connected to the outer conductor of the cable being tested, an elongated cylindrical conductor; means for securing the cable being tested within said cylindrical conductor, said last-named means providing a short circuit connection between the outer conductor of said cable and said elongated cylindrical conductor, a second cylindrical element located coaxial with said cylindrical conductor and connected to the other end thereof, a coil of conductive material located within and coaxial with said second cylindrical element, one end of said coil being connected to the outer conductor of said second cable and the other end being connected to the cylindrical conductor adjacent said cylindrical element, a signal indicating means having a coaxial input means, the outer conductor of said input means being connected to the junction of said elongated conductor and said coil and the center conductor being connected to the outer conductor of said second cable, a signal generating means having a signal attenuating means therein, means for connecting said signal generating means alternately to the cable being tested and to said second cable, and an attenuating means in said second cable for matching the cable impedance and the impedance of the signal generating means.

References Cited in the file of this patent

UNITED STATES PATENTS 2,446,195  Shive _____ Aug. 3, 1948
2,747,160  Bird _____ May 22, 1956

OTHER REFERENCES

Jones: Proceedings of the IEE, vol. 100, part IV, No. 5, October 1953, pp. 34–38.